Oct. 31, 1967
J. R. WEAVER, JR., ET AL  3,350,497
SHIELDED PASSAGEWAY INTERCONNECTION FOR
RADIO-FREQUENCY SHELTERS
Filed Aug. 23, 1965
4 Sheets-Sheet 1
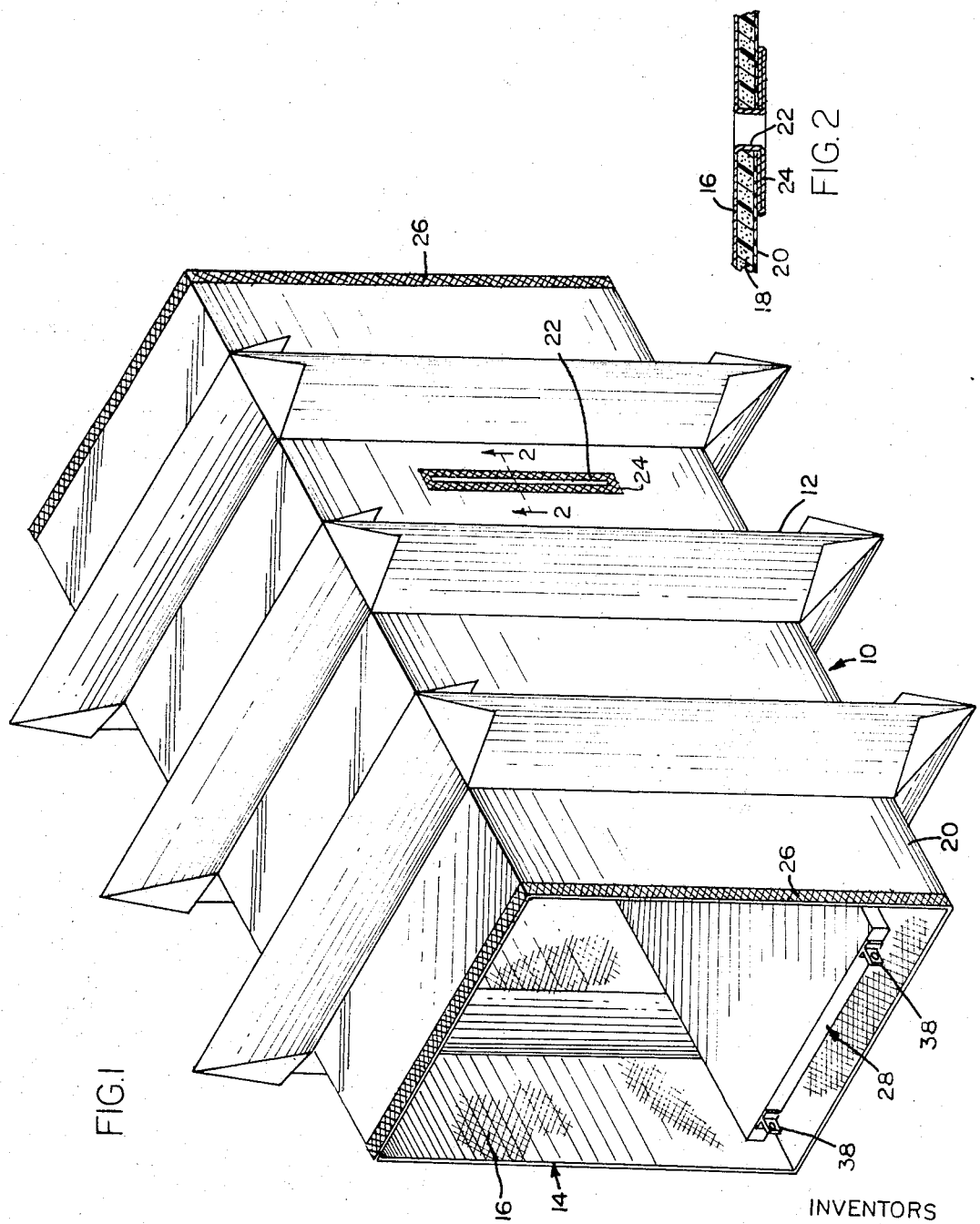
INVENTORS
JOHN R. WEAVER, JR.
CHARLES J. CARSON
BY
Kenway, Jenney & Hildreth
ATTORNEYS Oct. 31, 1967
J. R. WEAVER, JR., ET AL 3,350,497
SHIELDED PASSAGEWAY INTERCONNECTION FOR
RADIO-FREQUENCY SHELTERS
Filed Aug. 23, 1965
4 Sheets-Sheet 2
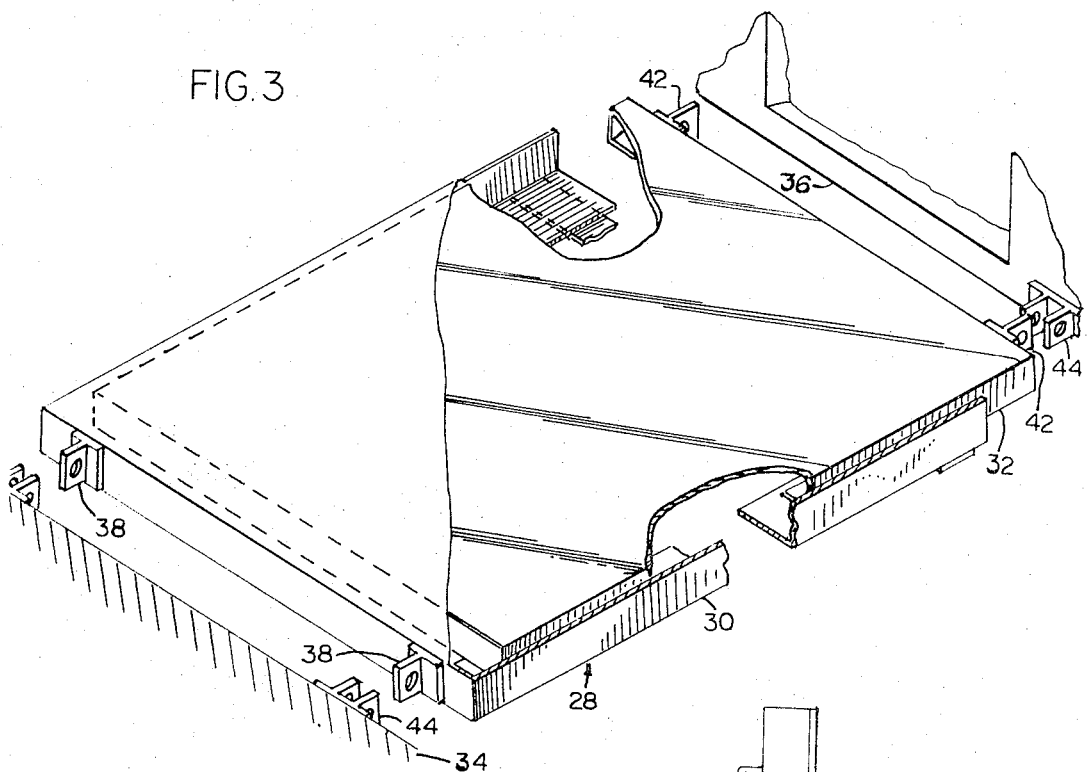
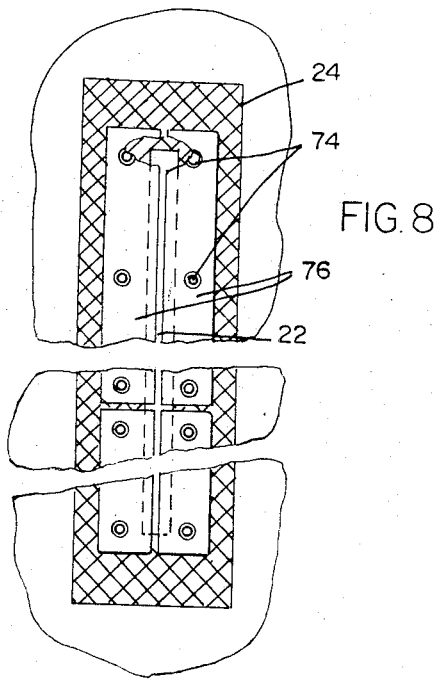
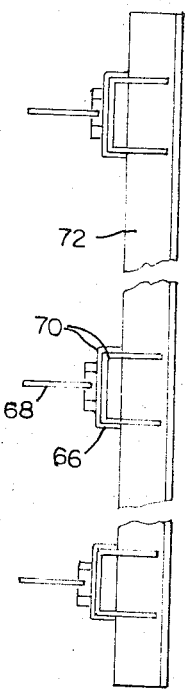
INVENTORS
JOHN R. WEAVER, JR.
BY, CHARLES J. CARSON
Kenway, Jenney & Hildreth
ATTORNEYS Oct. 31, 1967  J. R. WEAVER, JR., ETAL  3,350,497
SHIELDED PASSAGEWAY INTERCONNECTION FOR
RADIO-FREQUENCY SHELTERS
Filed Aug. 23, 1965  4 Sheets-Sheet 3

INVENTORS
JOHN R. WEAVER, JR.
BY, CHARLES J. CARSON
Kenway, Jenney & Hildreth
ATTORNEYS INVENTORS
JOHN R. WEAVER, JR
CHARLES J. CARSON
BY,
Kenway, Jenney & Hildreth
ATTORNEYS

United States Patent Office 3,350,497
Patented Oct. 31, 1967

3,350,497
SHIELDED PASSAGEWAY INTERCONNECTION FOR RADIO-FREQUENCY SHELTERS
John R. Weaver, Jr., Rowley, and Charles J. Carson, Danvers, Mass., assignors to Craig Systems Corporation, Lawrence, Mass., a corporation of Massachusetts
Filed Aug. 23, 1965, Ser. No. 481,681
13 Claims. (Cl. 174—35)

ABSTRACT OF THE DISCLOSURE

A collapsible bellows passageway for interconnecting shelters and for extending weather sealing and radio-frequency radiation shielding between them, as well as providing a connecting walkway. A flexible bellows has an external weather-protective layer and an internal layer of radio-frequency shielding screen, and these are sealed to and connected with corresponding layers of the shelters. A telescoping walkway within the bellows is transversely deflectable with the bellows to accommodate misalignment of the shelters.

---

This invention relates generally to portable communications shelters of the type which are shielded against weather and against externally generated electromagnetic radiation; and more particularly relates to an improved means for interconnecting two or more such shelters to provide for free passage of operating personnel and for electrical interconnection between the shelters, without detracting from the effectiveness of shielding of the installation.

In setting up a pair of communications shelters in the field to form a common installation, it would be most difficult to align them accurately with one another, either as to parallelism or spacing between confronting walls. Yet in order to couple the enclosures provided by the shelters for joint use, it is necessary to secure continuous radio-frequency shielding of the joint enclosure, and to obtain adequate weather protection as well. At the same time, the interconnecting means should provide a safe walkway for the passage of personnel. Finally, some means of emergency exit should be furnished which will not detract from the effectiveness of the shielding.

It is the general object of the present invention to provide an improved interconnecting passageway which maintains the effectiveness of the radio-frequency and weather shielding of a pair of shielded shelters connected thereby in a common installation, but which does not require accurate angular alignment or precise relative spacing of the shelters. It is a further object to provide an improved connecting passageway for shielded shelters which is flexible and extensible to accommodate variations in shelter spacing and alignment, and collapsible for transportation with the shelters. It is a further object to provide for emergency exit of personnel without detracting from the effectiveness of radio-frequency and weather shielding of the installation. Additional objects and advantages of the invention will become apparent as the following description proceeds.

Briefly stated, we may carry out our invention in a preferred embodiment by forming a transversely flexible and longitudinally-extensible bellows of an external layer of weather-resistant protective material such as neoprene-coated nylon, an intermediate layer of insulating material such as flexible polyurethane, and an internal layer of radio-frequency shielding material such as aluminum screening for shielding the interior of the passageway against external electromagnetic radiation. A walkway comprising telescoping tubular parts extends longitudinally through the bellows, and the ends of both parts are attached to a pair of adjcaent shelters to mate with entrance openings therein. The internal radio-frequency shielding material of the bellows is brought into continuous electrical contact with the shielding layer of each shelter about the entrance openings, and the outer layer is sealed against the shelter to form a water-tight connection. The transverse flexibility of the bellows and walkway permits sealing connection to be made even though the shelter openings may be angularly or transversely misaligned; and the extensibility of the bellows and walkway permits connection to be made without any accuracy of spacing between the shelters. And if it is desired to move the installation, both elements of the passageway may be collapsed longitudinally and conveniently transported.

The telescoping parts of the walkway may be made to fit snugly together in the vertical dimension, provided that pivotal connection on a single axis is made between the walkway and each of the shelters, as this will permit angular misalignment between the shelters in the vertical plane which extends parallel to the walkway. However, to accommodate angular misalignment in the horizontal plane, it is necessary that these parts have some clearance in horizontal dimensions. Further, if a relative twisting of the shelter openings is to be permitted, i.e., an angular misalignment in the vertical plane which is transverse to the walkway, the telescoping parts of the walkway should also have a loose fit in the vertical dimension. In this case, the parts should overlap sufficiently to insure firm support for personnel passing through the passageway.

According to an additional feature, quick emergency egress is available through an opening in the side wall of the passageway; and to prevent loss of shielding effectiveness, this opening is normally closed by removable internal clamps which clip metal shielding strips in overlapping relation to the shielding material about the opening.

While the specification concludes with claims particularly pointing out the subject matter which we regard as our invention, it is believed that a clearer understanding may be gained from the following detailed description of a preferred embodiment thereof, referring to the accompanying drawings, in which:

FIG. 1 is a pictorial view showing a preferred embodiment of the passageway, detached from the shelters which it is to connect;

FIG. 2 is a fragmentary sectional view of an exit opening in the passageway, taken along line 2—2 in FIG. 1;

FIG. 3 is a fragmentary pictorial view of a walkway element of the passageway, showing the means of connection to the shelters;

FIG. 8 is a fragmentary view in elevation of the closed exit opening, viewed from a point outside the passageway;

FIG. 9 is a view in end elevation of the internal clamping means of FIG. 7;

Figure 6:
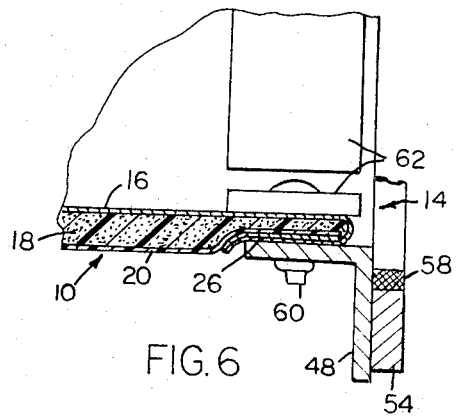
FIG. 6 is a fragmentary sectional view on an enlarged scale, showing the connection of the passageway to the frame.

Referring first to FIGS. 1 and 2, the passageway comprises an extensible bellows 10 having folded accordion pleats 12, and terminates in rectangular openings 14 for connection with mating access openings in the shelters. The bellows is formed of a flexible laminated material, having an internal layer 16 of flexible radio-frequency shielding material, such as aluminum screening; an intermediate layer 18 of flexible insulating material, such as polyurethane foam; and an external layer 20 of flexible weather-resistant and preferably water-proof material, such as neoprene-coated nylon. However, other combinations of laminated material, including an inner layer of flexible material which is effective to attenuate electromagnetic radiation to the degree desired, and an outer weather-proof layer, may be used alternatively.

An emergency exit opening 22 is formed in one side wall of the passageway for the escape of personnel. The internal screening material 16 is lapped over the outer layer 20 about this opening, to form a lip 24 for cooperation with clamping means which will later be described, to provide shielding of the opening 22 in normal use. Further, the screening layer is extended to form a reverse lip 26 over the exterior layer about the end opening 14, for electrical connection with the shielding material of the shelters.

A walkway generally indicated at 28, and shown in detail in FIG. 3, is received through the passageway for the passage of personnel between the shelters. The walkway comprises telescoping rectangular tubular members 30 and 32, which can be telescoped into nested relation as shown in FIG. 3 for transport with the collapsed passageway. In the preferred form shown, the external width dimension of the inner member 32 is somewhat less than the internal width dimension of the outer member 30, so that some angular misalignment is permitted in the horizontal plane. This makes it possible to connect the walkway, as well as the passageway 10, to shelters which are angularly misaligned in this plane.

In the form shown, the walkway is pivotally connected to shelters 34 and 36 by means of a pair of ears 38 mounted on the end wall of the element 30, and another pair of ears 42 mounted on the exposed end wall of the element 32. These ears are secured by pins or bolts (not shown) in mating pairs of double ears 44 mounted on the end walls of the shelters, on either side of their entrance openings. As indicated previously, each pair of ears, at either end of the walkway, should lie on a common pivotal axis to allow angular misalignment of the shelter walls in a vertical plane extending longitudinally of the walkway. If relative canting between the shelters in a vertical plane transverse to the passageway must be permitted, there should be a correspondingly loose fit between the members 30 and 32 in the vertical dimension, to allow twisting of the walkway.

Figure 4:
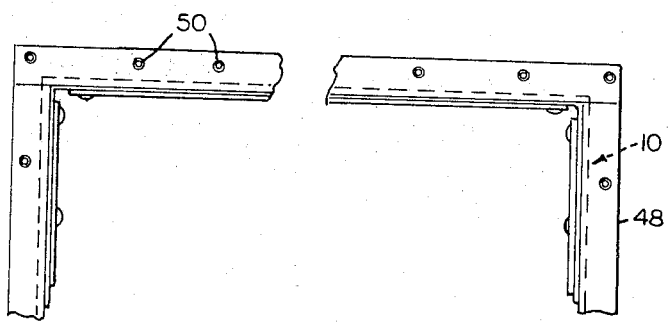
FIG. 4 is a view in end elevation of a frame for connecting and sealing the passageway to a shelter.
Figure 5:
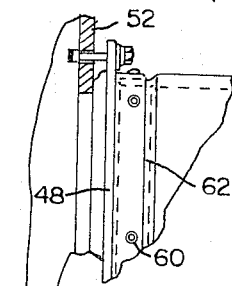
FIG. 5 is a fragmentary view in side elevation showing the passageway connected to one shelter.

Referring now to FIGS. 4–6, means for attaching the ends of the passageway to the shelters comprise a pair of conductive L-section frames 48, each for cooperation with one end of the passage. Each frame is secured by means such as expansion bolts 50 to the wall 52 of the mating shelter. Weather sealing is obtained by means of a gasket 54 of elastomeric material, which extends peripherally about the access opening 56 in the shelter wall. The radio-frequency shielding of the installation as a whole is made continuous by forming an electrical connection from the screening lip 26, through the conductive frame 48, and thence through a gasket 58 of compressible conductive material such as woven aluminum cable, to the shelter wall 52. The gasket 58 passes about the opening interiorly of the gasket 54 for compression contact with the conductive shielding 52 of the shelter. The end portions of the passageway are securely affixed to the frames 48 by means of rivets 60 and interior reinforcing bars 62. Thus, the common enclosure defined by the shelters and the passageway is continuously enclosed by conductive shielding material, and is also fully sealed against intrusion of moisture. Effective control of internal atmospheric humidity and temperature of the entire installation can therefore be obtained by an air conditioning plant carried by one of the shelters.

Figure 7:
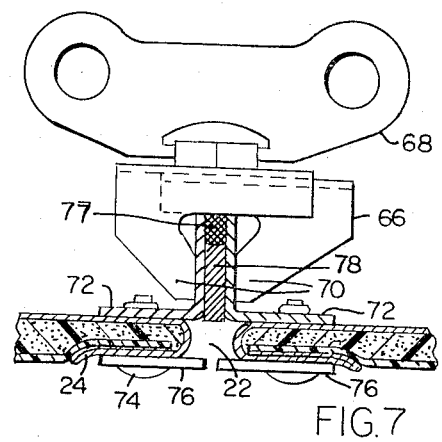
FIG. 7 is a view similar to FIG. 2, also showing a removable clamping means for closing and shielding an emergency exit opening in the passageway.

In order to prevent an interruption of the radio-frequency and weather shielding at the emergency exit opening 22, removable clamping means are used, as shown in FIGS. 7–9. These comprise a series of removable clamps 66 of a commercially obtainable type, which are operable by rotation of keys 68. The jaws 70 of the clamps clip between them a pair of L-section conductive clamping bars 72, which are secured through the passage walls by means of rivets 74. External conductive bars 76 are secured by the rivets in aligned relationship with the bars 72, and partially overlap the opening 22 to stiffen the structure and to enhance the shielding effect. A compressible conductive cable 77, which may be of woven aluminum mesh, and an elastomeric sealing strip 78, are interposed between the clamping bars 72 to insure optimum sealing and electrical contact between the parts. If it becomes necessary for personnel to escape from the combined shelters, and it is not feasible to leave by the doors normally provided, the clamp 66 may be opened quickly for egress through the opening 22.

The RF shielded passageway provides varying degrees of shielding effectiveness to low impedance waves (magnetic fields), high impedance waves (electric fields), and plane waves over the frequency range of at least 14 kilocycles to 10,000 megacycles. The degree of shielding effectiveness, as regards wave impedance and frequency response, can be modified by selection of the shielding material and the number of layers of shielding material.

Figure 10:
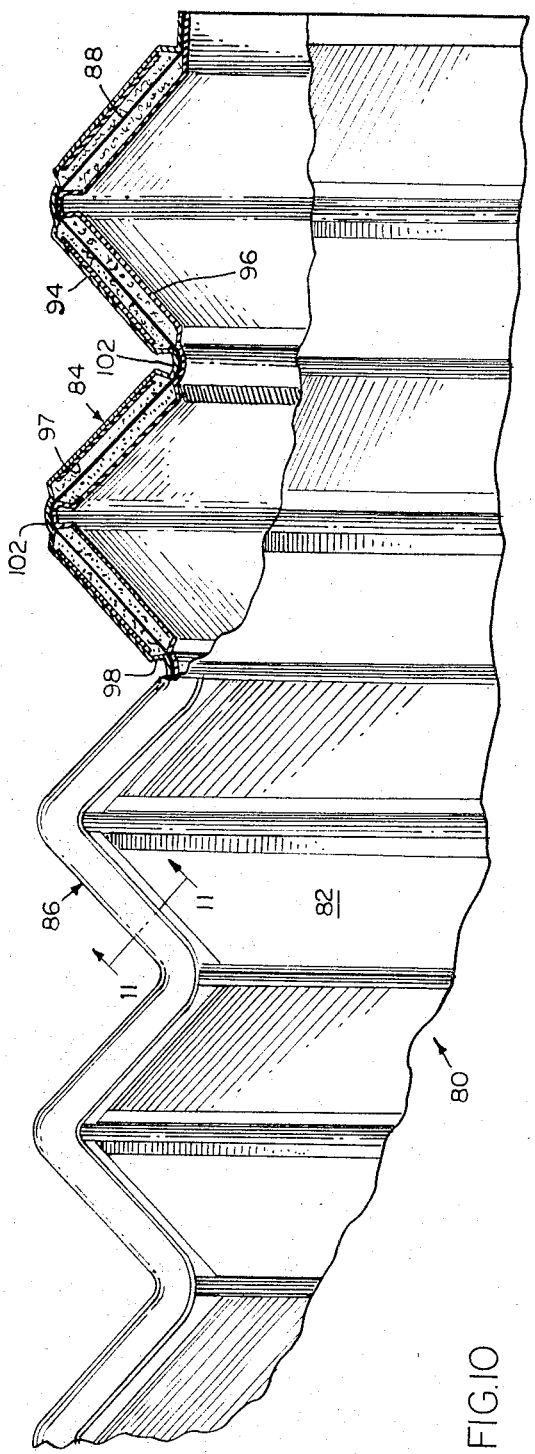
FIG. 10 is a fragmentary view in side elevation and partially in section of a modified passageway.
Figure 11:
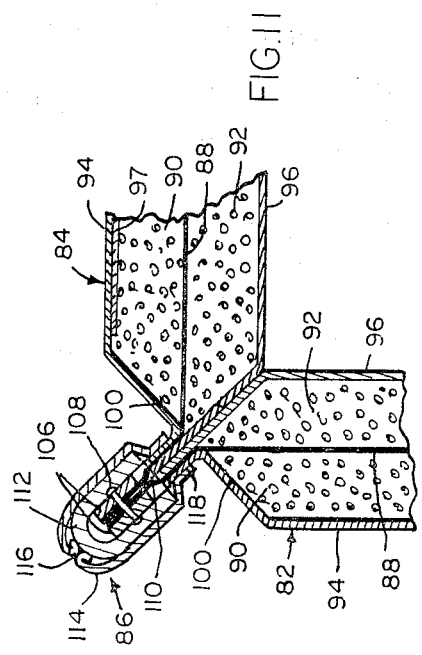
FIG. 11 is a fragmentary sectional view taken along line 11—11 in FIG. 10.

A modified passageway construction is shown in FIGS. 10 and 11, in which the passageway 80 is formerd of separate side panels 82 and top or bottom panels 84, each folded in matching convolutions, and joined along their lateral edges by means of radio-frequency and weather-shielding joints generally designated at 86. In this case, each section of either panel 82 and 84 includes an internal layer 88 of flexible radio-frequency shielding material, such as aluminum screening, sandwiched between intermediate layers 90 and 92 of flexible insulating material, such as polyurethane foam. The sandwich is completed by an external layer 94 and an internal layer 96 of weather-resistant material such as nylon. A metal reinforcing plate 97 is inserted under the layer 94 in each section of only the top panel 84, for added support against accumulated snow.

To permit the panels to be folded at 102 between flat sections, and thus form the bellows convolutions, the layers 90 and 92 of foam terminate in inclined side edges 98 and longitudinal edges 100, and the internal and external layers 96 and 94 of protective material converge into direct contact with the shielding layer 88 beyond these edges. Along the lateral edges at which the side, top, and bottom panels meet, the shielding layers 88 are held in electrically-conductive contact by means of a series of metallic strips 106 and suitable fasteners such as rivets 108. The edges of the protective layers 94 and 96 terminate short of the electrical junctions, as shown at 110 in FIG. 11, to permit this contact. Each pair of strips 106 terminates between adjacent folds in the panels, to permit collapsing of the bellows. Each joint 86 is completed by a strip protective polyurethane foam 112 folded over the strips 106, and by overlying protective strips 114 of nylon, which are cemented together at 116, and cemented to the layers 94 at 118. The strips 112 and 114 extend over the full length of the bellows, unlike the discontinuous series of metallic strips 106. The bellows thus constructed is employed in substantially the same manner as the bellows described previously in connection with FIGS. 1–10.

While we have illustrated and described a preferred embodiment of our invention by way of illustration, it will be apparent to those skilled in the art that various changes and modifications may be made therein without departing from the true spirit and scope of the invention,

What we claim is:

1. In combination with a pair of enclosures each having an entrance opening and being encased with radio-frequency shielding material providing enclosed spaces free from externally-generated electromagnetic radiation; a passageway interconnecting said openings and providing a radio-frequency and weather-shielded communication between said enclosures, comprising a collapsible bellows including a layer of radio-frequency shielding material, said bellows terminating in end openings mating with said entrance openings; said bellows being transversely flexible to accept misalignment of said entrance openings in horizontal and vertical planes while maintaining radio-frequency and weather-shielding of said enclosures, extensible for connection to said enclosures within a range of spacings therebetween, and collapsible for transportation with said enclosures; and means sealing said bellows with said enclosures about said entrance openings and establishing continuous electrical contact between the radio-frequency shielding materials of said bellows and of each of said enclosures about each entrance opening.

2. Apparatus as recited in claim 1, in which said bellows is formed of separate side, top, and bottom panels each including individual sheets of radio-frequency shielding material, and being formed with mating convolutions; adjacent lateral edges of said sheets of radio-frequency shielding material being joined together in electrical contact said panels being joined externally of said strips to provide continuous weather shielding at the intersections between the side, top, and bottom panels.

3. In combination with a pair of enclosures each having an entrance opening and being encased with radio-frequency shielding material providing enclosed spaces free from externally-generated electromagnetic radiation: a passageway interconnecting said openings and providing a radio frequency-and weather-shielded communication between said enclosures, comprising a shielded collapsible bellows having an external layer of flexible protective material and an internal layer of flexible radio-frequency shielding material, said bellows terminating in end openings for mating with said entrance openings; said bellows being transversely flexible to accept misalignment of said entrance openings in horizontal and vertical planes while maintaining radio frequency-and weather-shielding of said enclosure, extensible for connection to said enclosures within a range of spacings therebetween, and collapsible for transportation with said enclosures; an dmeans lapsible for transportation with said enclosures and means sealing said bellows with said enclosures about said entrance openings and establishing continuous electrical contact between the radio-frequency shielding materials of said bellows and of each of said enclosures about each entrance opening.

4. Apparatus as recited in claim 3, in which said external layer of said bellows comprises a sheet of waterproof plastic material and said internal layer comprises conductive metal screening, together with an intermediate layer of flexible insulating material.

5. Apparatus as recited in claim 4, together with a further intermediate layer of flexible insulating material internal to said layer of metal screening, and a further layer of plastic material internal to said further intermediate layer.

6. Apparatus as recited in claim 3, in which said bellows is formed of separate side, top and bottom panels each having an individual external layer of flexible protective material, an individual internal layer of flexible radio-frequency shielding material, and an individual intermediate layer of flexible insulating material; said intermediate layers terminating inwardly from the lateral edges of said panels; together with means joining said internal shielding layers of adjoining panels together in conductive engagement; said external layers being sealed to one another along the lateral edges of said panels to unify said external layer of protective material about said bellows.

7. Apparatus as recited in claim 3, in which said bellows is formed with an opening for emergency egress, together with separable conductive sealing means normally sealing and shielding said opening, and clamping means gripping said sealing means, said clamping means being removable from the interior of said passageway for separation of said sealing means.

8. In combination with a pair of enclosures each having an entrance opening and being encased with radio-frequency shielding material providing enclosed spaces free from externally-generated electromagnetic radiation; a passageway interconnecting said openings and providing a radio-frequency-and weather-shielded communication between said enclosures, comprising a collapsible bellows encased with radio-frequency shielding material, said bellows terminating in end openings mating with said entrance openings; a walkway extending interiorly of said bellows and secured to each of said enclosures; said bellows and said walkway being transversely deflectable to accept misalignment of said entrance openings in horizontal and vertical planes while maintaining radio-frequency-and weather-shielding of said enclosures, extensible for connection to said enclosures within a range of spacings therebetween, and collapsible for transportation with said enclosures; and means for sealing said bellows with said enclosures about said entrance openings and establishing continuous electrical contact between the radio-frequency shielding materials of said bellows and of each of said enclosures about each entrance opening.

9. Apparatus as recited in claim 8, in which said walkway comprises telescoping tubular members loosely interfitting to permit transverse deflection of the walkway in at least the horizontal plane to accommodate angular misalignment of said enclosure in a horizontal plane.

10. Apparatus as recited in claim 8, in which said walkway is pivotally secured to each of said enclosures about substantially horizontal axes to accommodate angular misalignment or relative displacement of said enclosures in a vertical plane extending longitudinally of said walkway.

11. In combination with a pair of enclosures each having an entrance opening and being encased with radio-frequency shielding material providing enclosed spaces free from externally-generated electromagnetic radiation: a passageway interconnecting said openings and providing a radio frequency-and weather-shielded communication between said enclosures, comprising a shielding collapsible bellows having an external layer of flexible protective material and an internal layer of flexible radio-frequency shielding material, said bellows terminating in end openings mating with said entrance openings; a walkway extending interiorly of said bellows and secured to each of said enclosures; said bellows and said walkway being transversely deflectable to accept misalignment of said entrance openings in horizontal and vertical planes while maintaining radio frequency-and weather-shielding of said enclosures, extensible for connection to said enclosures within a range of spacings therebetween, and collapsible for transportation with said enclosures; and means sealing said bellows with said enclosures about said entrance openings and establishing continuous electrical contact between the radio-frequency shielding materials of said bellows and of each of said enclosures about each entrance opening.

12. A passageway for interconnecting entrance openings in enclosures encased with radio-frequency shielding material and for providing a radio-frequency-and weather-shielded communication between said enclosures, comprising a radio-frequency shielded collapsible bellows, said bellows terminating in end openings for mating with said entrance openings; said bellows being transversely flexible to accept misalignment of said entrance openings in horizontal and vertical planes, extensible for connection to said enclosures within a range of spacings therebetween, and collapsible for transportation; said bellows provided with an encasing layer of radio-frequency shielding material extending between said end openings; means for sealing said bellows against said enclosures about said end openings; and means for establishing continuous electrical contact between said encasing layer of radio-frequency shielding material and the shielding material of said enclosures.

13. A passageway for interconnecting entrance openings in enclosures encased with radio-frequency shielding material; and for providing a radio-frequency-and weather-shielded communication between said enclosures, comprising a radio-frequency shielded collapsible bellows, said bellows terminating in end openings for mating with said entrance openings; a walkway separate from said bellows and extending interiorly of said bellows for attachment to each of said enclosures; said bellows and said walkway being transversely deflectable to accept misalignment of said entrance openings in horizontal and vertical planes, extensible for connection to said enclosures within a range of spacings therebetween, and collapsible for transportation; said bellows being provided with an encasing layer of radio-frequency shielding material extending between said end openings; means for sealing said bellows against said enclosures about said end openings and means for establishing continuous electrical contact between said encasing layer of radio-frequency shielding material and the shielding material of said enclosures.

References Cited

UNITED STATES PATENTS

| 409,181 | 8/1889 | De Ferranti. | |
| 3,036,148 | 5/1962 | Swerdlow | 174—85 |

DARRELL L. CLAY, *Primary Examiner.*

UNITED STATES PATENT OFFICE
CERTIFICATE OF CORRECTION

Patent No. 3,350,497                     October 31, 1967

John R. Weaver, Jr., et al.

It is hereby certified that error appears in the above numbered patent requiring correction and that the said Letters Patent should read as corrected below.

Column 6, line 30, after "means" strike out "for"; column 7, line 5, after "bellows" insert -- being --.

Signed and sealed this 6th day of May 1969.

(SEAL)
Attest:

Edward M. Fletcher, Jr.
Attesting Officer

Commissioner of Patents